June 26, 1962 H. R. GRIESHABER 3,040,739
SURGICAL RETRACTOR
Filed July 17, 1959 3 Sheets-Sheet 2
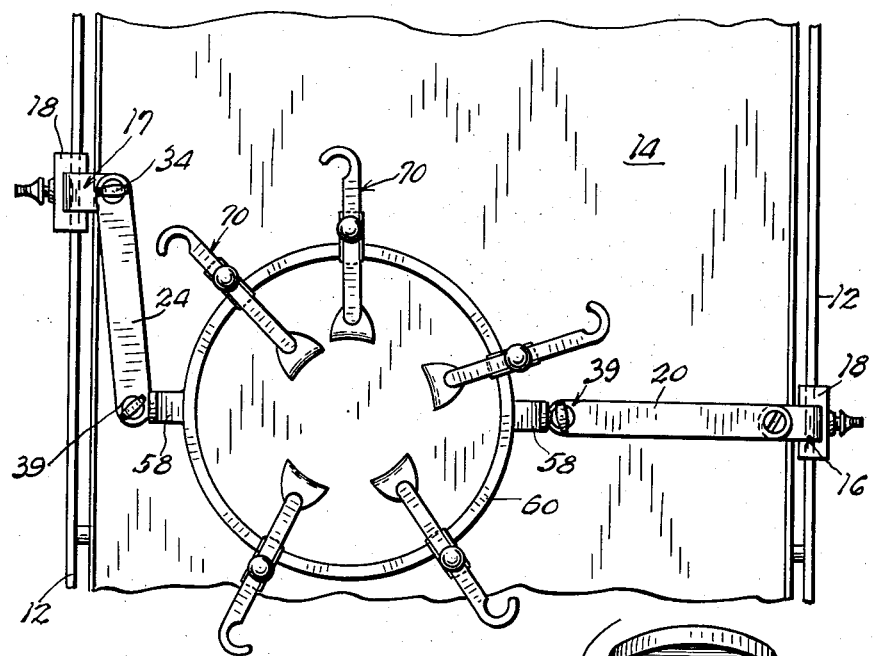
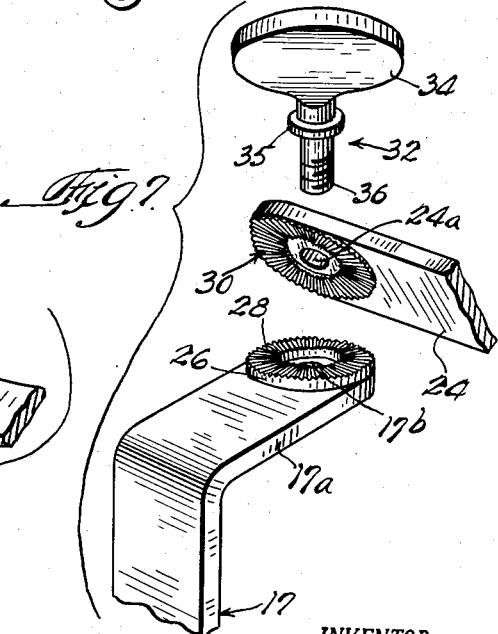
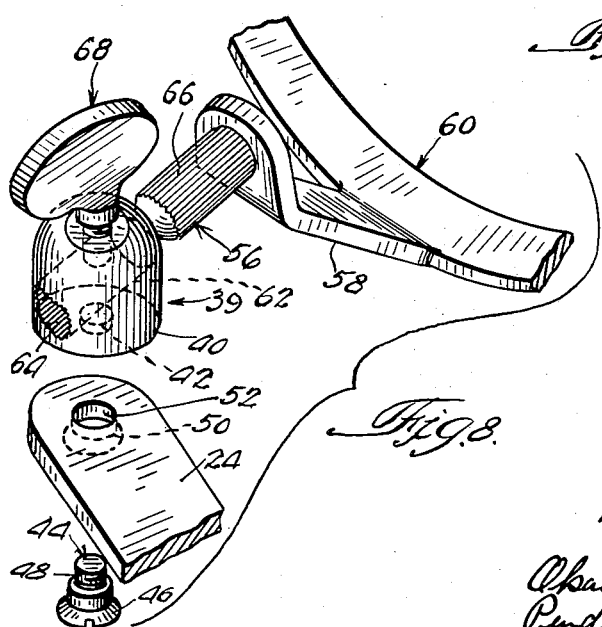
INVENTOR.
Herman R. Grieshaber.
BY
Olsen, Mecklenburger, von Holst,
Pendleton & Neuman.

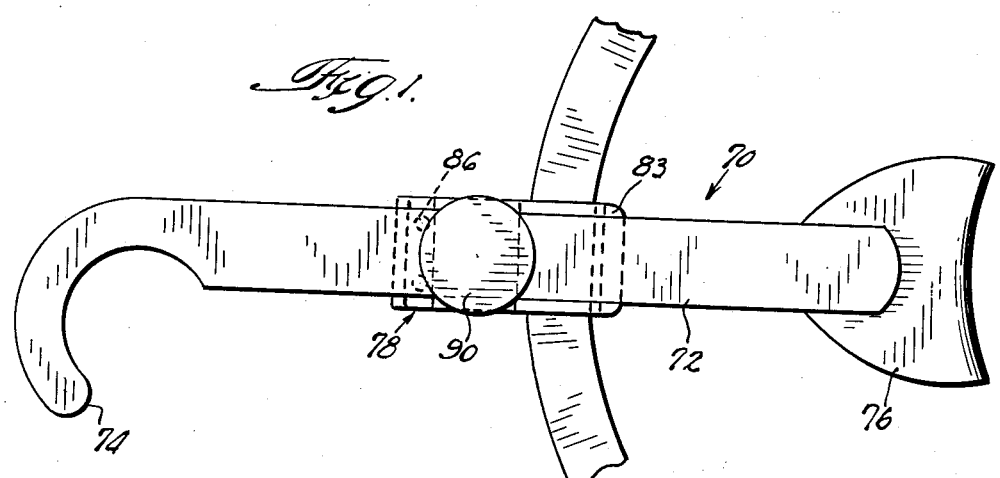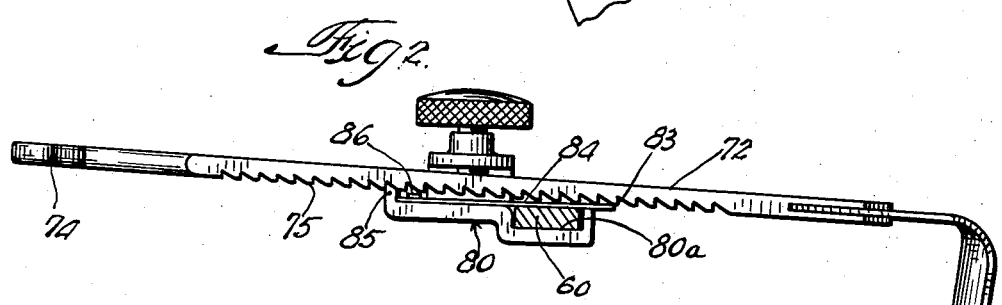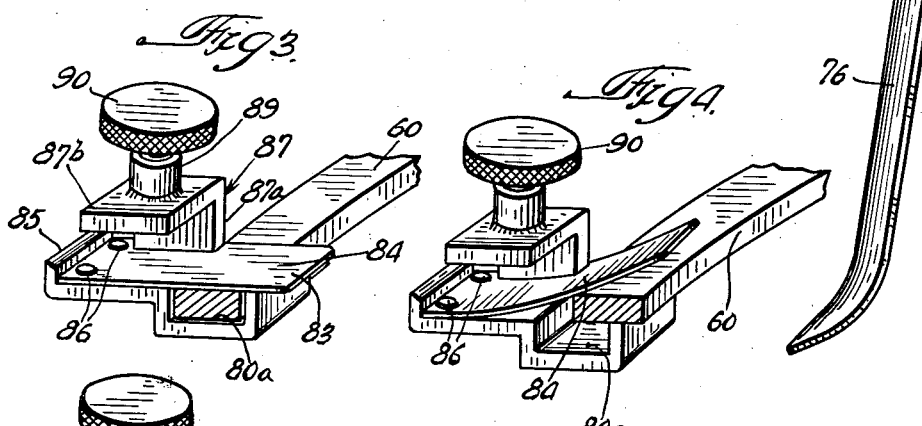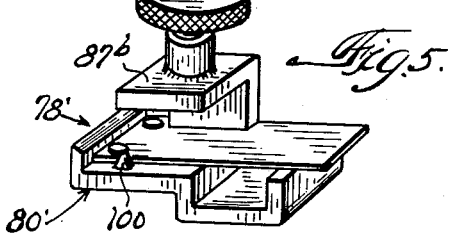

June 26, 1962 H. R. GRIESHABER 3,040,739
SURGICAL RETRACTOR
Filed July 17, 1959 3 Sheets-Sheet 3

INVENTOR.
Herman R. Grieshaber
BY
Olsen, Mecklenburger, von Holst,
Pendleton & Neuman. Attys.

United States Patent Office 3,040,739
Patented June 26, 1962

3,040,739
SURGICAL RETRACTOR
Herman R. Grieshaber, 6825 N. Olcott St., Chicago, Ill.
Filed July 17, 1959, Ser. No. 827,760
12 Claims. (Cl. 128—20)

This invention relates to an improved surgical retractor and clip element for use therewith.

In the course of operating, particularly on the abdominal region of the body, retracting means must be employed for holding skin and flesh portions of the body away from the field of an operation. Obviously, the better exposed the area of operation is to a surgeon, the better the chances for success. Since the edges of a wound, as well as the viscera or other body organs, must be firmly and securely held in place in the normal course of an operation, it is apparent that adjustability and rigidity are desiderata sought after in retractor apparatus.

It is believed equally apparent that the rapidity with which a retractor may be properly assembled is of the utmost importance, since speed is quite often a factor contributing to the success of the operation.

It is an object of this invention, therefore, to provide a retractor which possesses great flexibility and utility and which may be readily positioned as desired, with a minimum number of adjustments.

It is another object of this invention to provide a novel clip for use in a retractor assembly which materially assists the speed with which the retracting elements may be put in operative position.

It is a further object of this invention to provide a surgical retractor which possesses great flexibility of movement although composed of a minimum number of parts.

It is a still further object of this invention to provide a surgical retractor composed of durable parts which are of simple design, thereby rendering the same relatively inexpensive to manufacture.

The above and other objects of this invention will become more apparent from the following discussion when read in the light of the accompanying drawing and appended claims.

In one embodiment of this invention, opposed upright supporting posts are provided, the lower end portions of which are adapted to be arranged in fixed positions by means of side rails and clamps commonly employed with operating tables. The upper portions of the posts are pivotally and permanently connected to linking arms, each of which has a clamp mounted on the distal end thereof. The clamps are adapted to receive projecting, diametrically opposed pins of a supporting ring on which retracting elements are supported. Clip means which are readily engageable and disengageable with the supporting ring engage arm portions of the retracting elements and readily position the retracting elements about the ring periphery. The linking arms are movable in a horizontal plane and position the ring in a desired location relative to the patient's body. The ring is rotatable about a horizontal axis by means of its engagement with the linking arm clamps, as will hereinafter be explained in greater detail.

For a more complete understanding of this invention, reference will now be made to the drawing in which:

FIGURE 1 is an enlarged fragmentary top plan view of a surgical retractor, including a retracting element-supporting ring portion and engaging clip;

FIG. 2 is a side elevational view of the retractor fragment illustrated in FIG. 1;

FIG. 3 is an enlarged perspective view of the improved retracting element clip member illustrated in engagement with a fragment of a supporting ring shown in section;

FIG. 4 is a view similar to FIG. 3 illustrating the clip member in the course of assembly with the supporting ring;

FIG. 5 is a perspective view similar to FIG. 3, showing a modified clip member;

FIG. 6 is a fragmentary top plan view of an operating table and the improved retractor assembly mounted thereon;

FIG. 7 is a fragmentary exploded enlarged perspective view of the supporting post and linking arm joint of the retractor assembly;

FIG. 8 is a fragmentary, exploded, enlarged perspective view of the clamp connection between the supporting ring and a linking arm of the retractor assembly;

Figure 9:
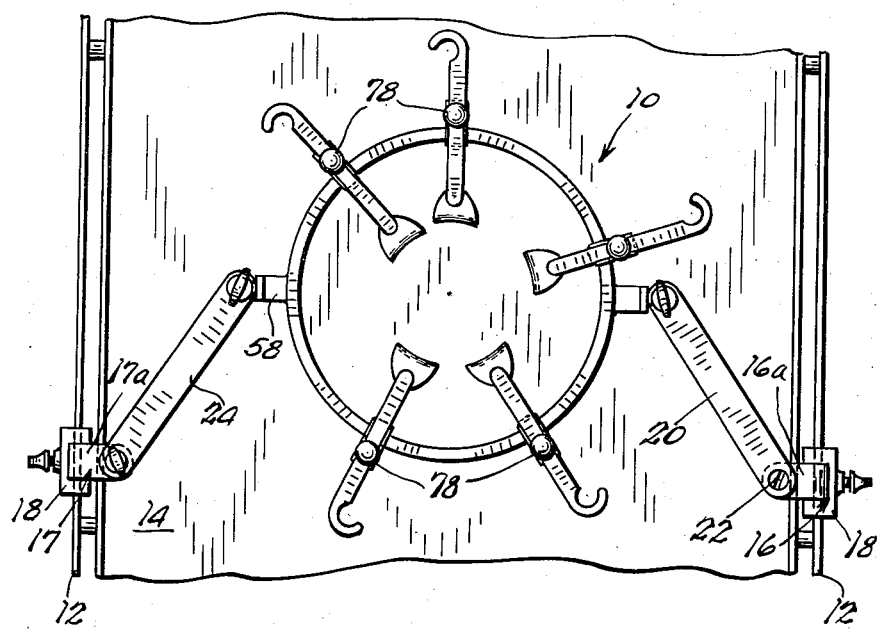
FIG. 9 is a view similar to FIG. 6, illustrating linking arms of the retractor assembly in a changed position.

Referring now more particularly to FIG. 6, an improved surgical retractor assembly 10 is illustrated, which is supported by side rails 12 of operating table 14. Each retractor assembly 10 has opposed supporting elements or posts 16 and 17 which are maintained in an erect position by means of clamp members 18, the latter being slidably movable along the table rails 12. The manner in which clamps 18 may engage rails 12 is more clearly seen from FIG. 10.

Figure 10:
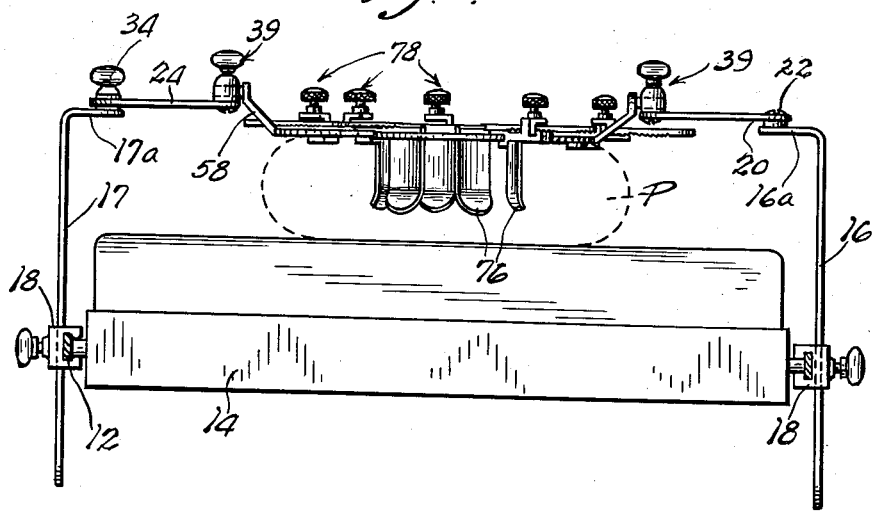
FIG. 10 is a bottom view of FIG. 9, and showing the patient's body in broken lines.

Extending laterally from the upper angularly offset portions 16a and 17a of supporting elements 16 and 17 are linking elements or arms 20 and 24, respectively. Arm 20, in this instance, is permanently assembled to supporting element end portion 16a by means of pivot pin 22, as illustrated in FIGS. 6, 9, and 10.

Supporting Element-Linking Element Juncture

The exploded view of FIG. 7 illustrates in detail the nature of the juncture between upper portion 17a of supporting element 17 and the linking element 24. It will be noted from FIG. 7 that a ring 26 is welded or otherwise suitably affixed to the distal end of supporting element portion 17a. Ring 26 has a plurality of upwardly projecting serrations or ridges 28 defining the upper exposed surface thereof. It is the function of the serrations 28 to interlock with complementary recesses formed on ring 30, the latter being affixed to the underside of one distal end of linking element 24. Linking element 24 and supporting element portion 17a may be held in any desired interlocking, nonrotatable, angular relationship by a thumb screw member 32. In the course of joint assembly screw shank 36 passes through a suitable opening 24a of arm 24 and is threaded into an opening 17b formed in element portion 17a. Screw member 32, as seen more clearly in FIG. 7, is provided with an enlarged head portion 34 to facilitate turning thereof and a collar 35 spaced from head portion 34 and adapted to engage the portion of arm 24 circumjacent opening 24a. Screw 32 urges the retractor elements 17a and 24 into interlocking relation.

Although the exploded view of FIG. 7 illustrates the components in disassembled relationship, it should be understood that the three illustrated components may, if desired, be permanently assembled together. If permanently assembled, the shank 36 of screw 32 will be of such length as to permit the screw to be unthreaded a sufficient amount so as to enable relative rotational movement between linking element 24 and supporting element portion 17a. Once supporting element 17 and arm 24 are in a fixed relationship, arm 20, which is freely pivotable about pin 22, will also assume a fixed relationship with supporting element 16.

Linking Element-Supporting Ring Juncture

Disposed and mounted on the inner end of each linking element 20 and 24 is a clamp 39, one of which is illustrated on an enlarged scale in FIG. 8. Clamp 39 comprises a housing 40 having a tapped opening 42 disposed in the bottom central portion thereof, which is adapted to receive a screw member 44 for securing the housing to the arm 20 or 24. Screw member 44 is provided with a slotted, enlarged head portion 46 and a threaded shank portion 48 which is adapted to terminate within opening 42. Enlarged head portion 46 of screw 44 is received in countersunk depression 50 of aperture 52 formed on the end of arm 20 or 24. Screw 44 is permanently threaded into housing 40, but permits ready rotation of the housing relative to the arm on which it is mounted.

It is the purpose of each clamp member 39 to receive and lockingly engage projections 56, supported by lugs 58 integrally connected to the periphery of a supporting ring 60, as will be more clearly seen from FIGS. 6 and 9. Projections 56 are coaxially arranged on the ring 60. Although the lug 58 is illustrated in FIG. 8 as upwardly inclined from the ring, it may be downwardly disposed relative thereto by rotating the ring 60 through an arc of 180°.

When the ring 60 is in an inverted position from that shown in FIG. 8, the plane of the upper surface of the ring 60 will be such that the enlarged head 34 of screw 36 and the adjustable clamp members 39, which are utilized in properly positioning linking arms 20 and 24, will not project above such ring surface and interfere with the manipulations of the surgeon or his assistants.

As will be seen from FIG. 8, each clamp housing 40 has an open end bore 62 therethrough which is adapted to receive one of the projections 56. It will also be noted from FIG. 8 that longitudinally extending splines 64 are formed along at least the bottom surface of bore 62. Splines 64 are adapted to mesh with complemental splines 66 formed on the periphery of projection 56, following insertion of projection 56 in bore 62. The projection 56 may be securely locked relative to bore 62 by means of a locking screw 68 carried on clamp housing 40 and which has the inner end thereof projecting transversely into bore 62 for engaging the periphery of accommodated projection 56.

Supporting ring 60 is adapted to be positioned over the open wound of a patient, schematically illustrated in FIG. 10. Because of the relatively long lengths of each of the linking arms 20 and 24 (i.e., approximately 11 inches) and the relatively large outside diameter of ring 60 (i.e., approximately 13 inches), when compared with the width of a standard operating table 14 (i.e., approximately 25 inches), it is possible to position the ring 60 so that it is adjacent one side of the table (see FIG. 6) or at any position intermediate the table sides (see FIGS. 9 and 10). It is to be understood, of course, that the lengths of arms 20 and 24 and the diameter of ring 60 may vary so as to accommodate an operating table 14 of any configuration.

As has been previously mentioned, it is very important to the success of a surgical operation that the field of operation be accessible to the operating surgeon without interference occasioned by surrounding body portions. Accordingly, skin, flesh and organs of the body are retracted from the area of operation by a plurality of retracting elements 70.

Retracting Elements and Clips Therefor

The retracting elements 70, in this instance, are of like construction and each includes an elongated central body portion 72 terminating at one end limit in a curved finger-engageable portion 74. Disposed at the opposed end limit of body portion 72 is a blade-like member 76, the function of the latter being to depend into the open wound of the patient and move the surrounding flesh or organs away from the field of operation, so that there will be no interference with the manipulations of the operating surgeon. The edges of the blade 76 are blunt and rounded to prevent cutting of the body portions engaged and retracted thereby. The size and shape of blade 76 will depend upon the type of surgery to be performed.

The underside of body portion 72 is provided with a plurality of transversely extending serrations 75. The function of serrations 75 will be described more fully hereinafter.

Each retracting element 70 is attached to ring 60 by a clip member 78, most clearly seen in FIGS. 3 and 4. Each clip 78 comprises an elongated body portion 80, the longitudinal axis of which is disposed in a substantially radial direction relative to the supporting ring 60 on which it is mounted. One end of body portion 80 is provided with a transversely extending pocket 80a, which is adapted to slidably accommodate a segment of ring 60 (see FIG. 3). The opposite end of body portion 80 is offset upwardly and terminates in a tapered edge 85. Secured by rivets 86 to body portion 80, adjacent edge 85, is a leaf spring 84 which extends therefrom into overlying relation with respect to the upper open side of pocket 80a. The free end 83 of spring 84 projects a slight amount beyond pocket end of body portion 80 so as to facilitate flexing of the spring when the clip 78 is being assembled or disassembled relative to ring 60 (see FIG. 4).

Disposed intermediate the end limits of body portion 80, and projecting upwardly therefrom, is an inverted L-shaped portion 87 defined by segments 87a and 87b. Segment 87b is spaced above and cooperates with the planar surface (see FIG. 4) of clip body portion 80 to provide a C-shaped clamp adapted to securely engage central body portion 72 of retracting element 70. An internally threaded boss 89 projects upwardly from the upper surface of segment 87b and is engaged by a threaded locking screw member 90.

It will be noted from FIG. 2 that when the clip and retracting element are in assembled relation, the beveled edge 85 is in meshing engagement with a selected serration 75 formed on the element undersurface. The latter engagement obviates the possibility of longitudinal slippage of the retracting element inwardly toward the wound as a result of the tension effected by the retracted wound peripheral portions which are removed from their normal body position. It will also be noted from FIG. 2 that each serration 75 is formed so as to permit ready sliding of the retracting element past the edge 85 when the locking screw is released and the element is pulled outwardly relative to ring 60. In addition, the serration configuration affords optimum restraining effect when engaged by edge 85 of the clip.

It is apparent from the foregoing description that the provided clip 78 may be readily assembled to supporting ring 60 in the manner illustrated in FIG. 4. All that need be done to effect engagement between the clip 78 and supporting ring 60 is raise the distal end 83 of the flexible strip 84, allowing a portion of the ring 60 to be inserted in the pocket or recessed portion 80a of the clip. Following this engagement, the clip will assume the self-supporting position illustrated in FIG. 3 without the need for any extraneous locking or securing means such as are required with other retractor clips of this type. Each clip 78 may be positioned as desired about half the ring periphery by merely sliding the clip about such peripheral portion. Each clip 78 may thus be disposed on the supporting ring without requiring engagement with a retracting element 70.

Use of Retractor Assembly

In the normal course of use, the assembly supporting elements 16 and 17 are appropriately positioned relative to the interposed bed and patient lying thereon, and the clamp members 18 are tightened. After the linking ele ments have appropriately disposed the supporting ring at a desired lateral location, locking screw 32 is tightened. The ring 60 will be in a locked position after screws 68 of clamps 39 are tightened.

It will be noted from the foregoing description that every movable connection or joint between elements of the provided retractor assembly is capable of being securely locked, with the exception of the pivot screw 22. The joint between supporting element 16 and linking element 20 need not be permanently locked in the normal course of retractor use so as to prevent relative movement, since movement will not be possible at this joint in view of the rigidity of the remainder of the assembly. It is, of course, conceivable that screw member 22 may be of a locking type, whereby supporting element 16 and linking element 20 are urged together in non-rotatable relationship.

After disposition of supporting ring 60 relative to the body of the patient, the blades 76 of retracting elements 70 engage appropriate portions of flesh, organs and the like, so that the operating surgeon may have ready access to the locus of operation. It is apparent from FIGS. 1 and 2 that after blade portion 76 of each retracting element has engaged an open wound portion, the retractor element is pulled outwardly by means of handle portion 74 until the engaged body portion of the patient has been retracted a desired distance.

The screw member 90 of clip member 78, which supports the retracting element 70, is then urged downwardly, whereby retracting element 70 is securely locked in place in the manner previously described.

It is seen, therefore, that the provided retractor assembly may be readily positioned and adjusted so as to be disposed over a desired portion of the body of the patient. Following desired disposition of supporting ring 60, the retracting elements are manipulated so as to provide a desired field of operation for the operating surgeon.

The clip members 78 of this invention may be readily disengaged from the supporting ring after the retracting elements have been removed from engagement therewith, or they may be retained on the ring by virtue of the resilient strip 84, in the manner previously described. In the normal position of assembly with the ring and retracting element 70, the clip member 78 is securely locked to ring 60, as will be noted more clearly from FIG. 2. It will be seen from the latter figure that the central portion 72 of the retracting element cooperates with the engaged portions of each clip to securely lock the clip to the ring.

Modified Clip Construction

FIG. 5 illustrates a modified clip construction 78' in which a projecting dimple 100 or the like may be disposed on the planar surface of clip body portion 80'. It is the purpose of dimple 100 to prevent lateral movement of the retracting element from between L-shaped segment 87b and underlying body portion 80' of the clip. The dimple or equivalent means, such as a lip, should not be of such a height as to prevent lateral disengagement of the retracting element after the screw 90 has been upwardly retracted.

In either form of the clip members 78 or 78', the retracting element is brought into assembled relation therewith, by sidewise movement of either the element or clip member, whereby the element passes through the open side of the clip element between segment 87b and body portion 80 or 80'. In either case the locking screw 90 must be in its unthreaded released position. The ease of assembly or disassembly of the retracting element with respect to the clip member greatly facilitates manipulation by the surgeon or his assistants of the retracting element during surgery.

It is seen, therefore, that a novel surgical retractor has been provided, which is composed of a number of simple parts and yet is of sturdy construction and readily positionable with a minimum number of manipulations. The provided retractor construction employs clip members of novel design which are self-supporting when engaged with the supporting ring and are capable of readily accommodating retracting elements of varying size and shape. The above-described clips greatly facilitate the use of the provided retractor construction, while effecting a sturdy and stable assembly with the remaining portions of the surgical retractor.

It is believed obvious that a number of changes may be made in the above-described surgical retractor which will effect constructions still remaining within the scope of the inventive concepts disclosed. It is intended, therefore, that this invention be limited only by the scope of the following claims.

I claim:

1. A clip for use in a surgical retractor, comprising an elongated body portion, one end of said body portion defining a transversely extending pocket, an opposed second end of said body portion being offset in a direction opposed to the bottom of said extending pocket, resilient means secured to a portion of said body portion and extending in overlying relation relative to said pocket, and an inverted L-shaped portion extending upwardly from one lateral edge portion of said elongated body portion intermediate the opposed end limits thereof, a segment of said L-shaped portion being in spaced overlying relation with respect to said body portion.

2. A clip for use in a surgical retractor, comprising an elongated body portion, one end of said body portion defining a transversely extending pocket, an opposed second end of said body portion being offset in a direction opposed to the bottom of said extending pocket, resilient means secured to a portion of said body portion adjacent said offset end and extending in overlying relation relative to said pocket, a first leg portion extending upwardly from a first lateral edge portion of said body portion adjacent said transversely extending pocket, a second leg portion formed integrally with said first leg portion at least partially overlying said body portion, and means mounted on said second leg portion and movable relative thereto toward said body portion.

3. In a surgical retractor, a supporting ring, a clip for use in selectively accommodating a retracting element on said supporting ring, said clip comprising an elongated body portion, one end of said body portion defining a transversely extending pocket, an opposed second end of said body portion being offset in a direction opposed to the bottom of said pocket and terminating in a tapered edge, resilient strip means secured to a portion of said body portion adjacent said tapered edge and extending in overlying relation relative to said pocket, said strip means and pocket defining an enclosure substantially equal in cross section to the cross section of said ring whereby a portion of said ring may be received in said pocket and said clip may be releasably locked to said ring by means of said resilient strip means, and means carried by said clip body portion and disposed intermediate said tapered edge and said transversely extending pocket for effective locking of such retracting element in selected positions of adjustment on said clip, said retracting element urging said flexible strip means against upper pocket-defining portions of said clip when said retracting element is locked to said clip thereby securely locking said ring within said clip pocket.

4. The clip as recited in claim 2 in combination with a protuberance disposed on a second lateral edge of said body portion and oppositely disposed with respect to said first leg portion, said protuberance extending in a direction toward said second leg portion and terminating a substantial distance therefrom.

5. The clip as recited in claim 4 in combination with a retracting element removably mounted on said clip and adjustable relative thereto into selected positions of locking engagement, the spacing between the distal end of said protuberance and said second leg portion being such as to permit passage of a portion of said retracting element therebetween.

6. In a surgical retractor for use in conjunction with an operating table, the combination of a supporting ring, pivot pins connected to substantially diametrically opposed portions of said supporting ring, two pivotally mounted linking arms relatively movable in a horizontal plane, clamp means for each of said arms mounted on one end portion thereof connected to a supporting ring pivot pin, vertically adjustable, spaced vertical supports independently and adjustably positionable along the sides of such operating table and pivotally engaging and supporting said linking arms, said supporting ring being rotatable about said pivot pins as an axis, said linking arms being adjustable in a horizontal plane, and retracting elements adjustably supported by said ring.

7. The combination as recited in claim 6, in which one of the pivotal connections between one of said linking arms and one of said vertical supports is non-lockable and freely pivotable.

8. In a surgical retractor, the combination of a supporting ring, pivot pins connected to substantially diametrically opposed portions of said supporting ring, two linking arms relatively movable in a horizontal plane, each of said arms having connecting means disposed at a first end limit thereof connected to one of said supporting ring pivot pins whereby said supporting ring may be rotatable thereabout, spaced vertical supports pivotally engaging and supporting said linking arms at second end limits thereof, clip means detachably connected to said supporting ring, said clip means having a resilient strip and an underlying transverse open-top pocket portion for accommodating and retaining therein a portion of said ring, said clip means having a slotted clamp portion arranged at right angles to said pocket portion, and retracting means lockingly engaged by said clip clamp portion in selected positions of adjustment, said retracting means when engaged by said clip means clamp portion urging said resilient strip against the open-top of the clip underlying transverse pocket portion whereby said clip is securely locked to said ring whenever said clip means clamp portion lockingly engages a retracting means.

9. The surgical retractor as recited in claim 8 in combination with an operating table, the sum of the lengths of said linking arms and said ring diameter being greater than the width of said operating table.

10. A clip for use in a surgical retractor having retracting elements and a supporting ring, said clip comprising a U-shaped pocket portion and resilient strip disposed thereover for lockably engaging a peripheral segment of such supporting ring positionable within said U-shaped pocket portion, said clip having a clamp portion, said clamp portion having upper and lower jaws for accommodating such retracting elements at substantially a right angle with respect to the accommodated ring segment, said clamp portion lower jaw being contiguous with said U-shaped pocket portion, and a lateral extension of said lower jaw disposed away from said U-shaped pocket on which said resilient strip is fixedly mounted.

11. A clip for use in a surgical retractor, comprising a U-shaped portion having two upstanding arms, a C-shaped clamp portion having opposed jaw portions, the lower jaw being contiguous with the distal end of one of said upstanding arms, said lower jaw and said upstanding arm terminal ends being substantially coplanar, said lower jaw having a lateral extension disposed away from said U-shaped portion, and a resilient strip fixedly mounted on said extension and disposed in overlying relation with said lower jaw and said U-shaped portion and contacting the distal ends of said upstanding arms.

12. A clip for use in a surgical retractor comprising an elongated body portion, one end of said body portion defining a transversely extending pocket means, substantially planar surface means contiguous with a distal portion of said pocket means; said surface means defining a part of said elongated body portion, resilient means secured to said planar surface means and extending in overlying relation relative to said pocket means, support means connected to said body portion extending therefrom in a direction away from said pocket means and disposed in spaced, overlying relation with a portion of said clip planar surface means, and means mounted in said overlying support means portion movable relative to the underlying body portion.

References Cited in the file of this patent

UNITED STATES PATENTS

| | | |
|---|---|---|
| 1,633,190 | Rader | June 21, 1927 |
| 1,747,799 | Straus | Feb. 18, 1930 |
| 1,987,826 | Heumann | Jan. 15, 1935 |
| 2,586,488 | Smith | Feb. 19, 1952 |
| 2,594,086 | Smith | Apr. 22, 1952 |
| 2,608,192 | Heitmeyer et al. | Aug. 26, 1952 |
| 2,623,517 | Barlow | Dec. 30, 1952 |
| 2,670,731 | Zoll et al. | Mar. 2, 1954 |
| 2,914,829 | Willemain | Dec. 1, 1959 |